ate 350-445 SR
OR 4,187,001

United States
SEARCH ROOM

Redwitz et al.

[11] 4,187,001
[45] Feb. 5, 1980

[54] VIEW EXPANDING APPARATUS

[75] Inventors: Robert F. Redwitz, S. Laguna; William G. Baker, Rolling Hills Estates, both of Calif.

[73] Assignee: Redwitz Baker Incorporated, Irvine, Calif.

[21] Appl. No.: 848,833

[22] Filed: Nov. 7, 1977

Related U.S. Application Data

[63] Continuation-in-part of Ser. No. 758,216, Jan. 10, 1977, abandoned.

[51] Int. Cl.² .............................................. G02B 17/00
[52] U.S. Cl. ...................................... 350/202; 16/137; 350/211; 350/307
[58] Field of Search ............... 350/202, 211, 307, 302; 16/137

[56] References Cited

U.S. PATENT DOCUMENTS 2,039,474  5/1936  Brunette .......................... 350/307 X
2,135,262  11/1938  Schumacher ..................... 350/307 X
3,809,462  5/1974  Baumgardner et al. .......... 350/211 X

FOREIGN PATENT DOCUMENTS 481354  5/1953  Italy .......................................... 350/202
279893  5/1928  United Kingdom ..................... 350/202
785359  10/1957  United Kingdom ..................... 350/202

*Primary Examiner*—Paul A. Sacher
*Attorney, Agent, or Firm*—Nilsson, Robbins, Dalgarn, Berliner, Carson & Wurst

[57]  ABSTRACT

A view expanding apparatus mounted on the inside lower right hand corner of an automobile windshield for eliminating the blind spot in the rear view of a motorist. A mirror is pivotally coupled to a negative lens, which may be a Fresnel lens, and the mirror lens construction is secured to the inside of the windshield. The negative lens expands the field of view and the angle between the lens and the mirror is adjustable so that the mirror reflects the expanded field of view for observation by the driver.

18 Claims, 7 Drawing Figures

VIEW EXPANDING APPARATUS

CROSS-REFERENCES TO RELATED APPLICATIONS

This application is a continuation-in-part of application Ser. No. 758,216, filed Jan. 10, 1977 and now abandoned.

BACKGROUND OF THE INVENTION

The present invention relates to a view expanding apparatus and more particularly to a blind spot eliminator mirror.

Rear view mirrors have been mounted on vehicle windshields to provide the motorist with a field of view to the rear of the vehicle. This, of course, helps the motorist to operate the vehicle in a safe manner. These mirrors reflect a field of view through the rear window of the vehicle and therefore leave a blind spot in the field of view between the rear window and the right side rear window.

Outside mirrors have been mounted on vehicles between the windshield and the front right side to provide the driver with vision in this blind spot. Such devices, however, can be easily stolen by persons outside the vehicle and otherwise tampered with. Furthermore, they are not readily adjustable from the driver's seat and since they are outside the vehicle tend to become dirty. In addition, the adjustment of the outside mirror can be altered by bumping it.

Various prior art devices have sought to expand the field of view of the driver and eliminate the blind spot using lenses, such as the devices, using Fresnel lenses, shown in U.S. Pat. Nos. 3,809,461 and 3,809,462 both to Baumgardner et al. The lenses produce an expanded viewing area, as will be described more fully hereinafter.

In these devices, the lens is mounted on the roof or outside side of the vehicle or in the rear of the vehicle and is used in conjunction with a rear view mirror. The rear view mirror conventionally mounted in the upper center portion of the windshield is often used, in which case the presence of passengers in the vehicle may block the line of sight between the lens and the rear view mirror.

Several of these devices require structural modifications of the body of the vehicle for mounting the lens on the roof of the vehicle. Several of these roof mounted devices include a periscope construction which tends to be complex.

SUMMARY OF THE INVENTION

The present invention provides a blind spot eliminator mirror mounted on the inside lower right hand corner of an automobile windshield. The mounting of the device on the inside of the vehicle prevents it from being stolen or tampered with. The device can be easily adjusted. Furthermore, the device remains clean and unobstructed by dust or snow.

The invention includes a mirror which is pivotally coupled to a lens having a negative focal length for providing the expanded rear view. Among the suitable lenses are a negative Fresnel lens having a grooved surface and a flat surface and standard negative lenses having one flat and one concave surface or two concave surfaces. In the first two cases, the flat surface faces either towards or away from the reflecting surface of the mirror. In the last case, one of the concave surfaces faces the reflecting surface.

The mirror and lens construction is secured to the lower right hand portion of the windshield to provide an expanded rear view of the area which is normally a blind spot when viewed using the standard rear view mirror. This feature avoids the possibility of a passenger obstructing the line of sight between the lens and the mirror.

One of the features of the invention is the pivotal mounting between the mirror and lens by a suitable common means to enable the motorist to adjust the angle between the mirror and lens to provide optimum viewing of the area which would otherwise be a blind spot. The device therefore lends itself to being mounted on the inside of the windshield in the lower right corner to enable a motorist to simply lean over toward the device, when the vehicle is at rest, and adjust the relative angle between the mirror and lens. This ease of adjustability is particularly significant over prior art devices wherein the lens is mounted in the rear of a vehicle or outside the vehicle.

The common means to which both the mirror and lens are pivotally mounted includes arm members having an adhesive surface attached thereto for securing the device to the inside surface of a vehicle. This renders the present invention particularly advantageous over prior art devices which require structural modifications of the vehicle body for purposes of mounting the lens on the roof of the vehicle as shown in FIG. 20 of U.S. Pat. No. 3,809,461.

DESCRIPTION OF EMBODIMENTS

Figure 1:
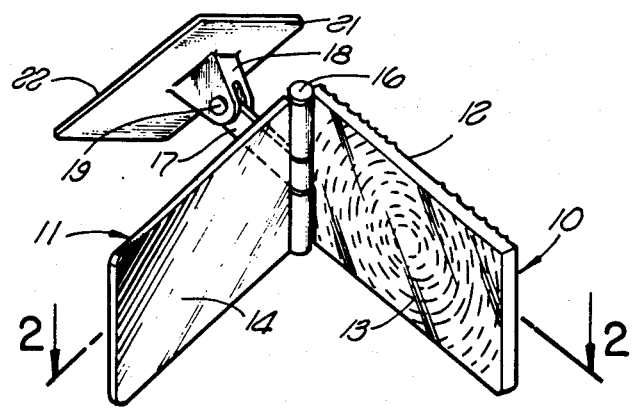
FIG. 1 is a perspective view of an embodiment of the present invention employing a Fresnel lens.
Figure 7:
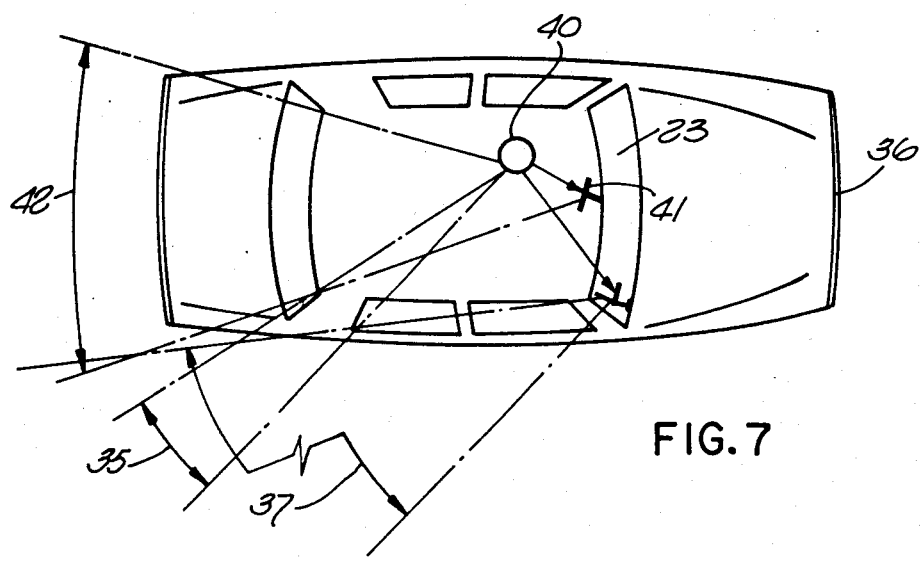
FIG. 7 is a view of an embodiment of the present invention mounted in a vehicle.

The view expanding apparatus of the embodiment of FIG. 1 includes a Fresnel lens 10 for providing an expanded field of view and a mirror 11 for reflecting the expanded field of view. Arm members are provided to connect the combination lens 10 and mirror 11 to the lower right hand corner of the windshield of the vehicle, on the inside surface thereof. As illustrated in FIG. 7, which is discussed below, the driver is, as a result, provided with an expanded rear view.

Figure 2:
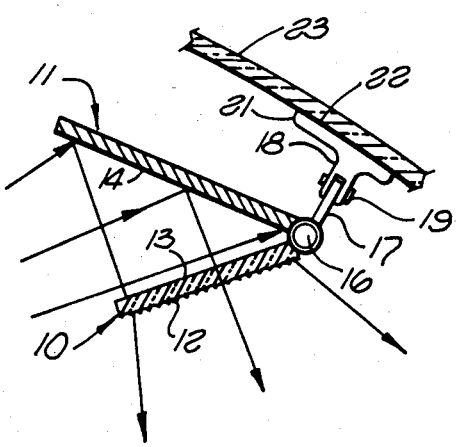
FIG. 2 is a cross-sectional plan view of FIG. 1 taken along the plane 2—2 of FIG. 1.

The Fresnel lens 10 has a grooved surface 12 and a flat surface 13 and the mirror 11 has its reflecting surface 14 facing the flat surface 13 at an angle as shown in FIGS. 1 and 2 to reflect the expanded rear view to the driver. The Fresnel lens 10 and the mirror 11 are pivotally connected together by a suitable means 16 such as a pin, bolt, rod or the like, to provide ease of adjustability of the angle between the flat surface 13 of the Fresnel lens 10 and the reflecting surface 14 of the mirror 11.

Connecting means is provided to secure the device to the windshield of a vehicle. The connecting means includes arm members 17 and 18 which may be pivoted with respect to each other around a suitable fastening means such as a nut and bolt 19 as shown in FIGS. 1 and 2. The pivoting of the arms 17 and 18 with respect to each other provides further adjustability of the device to improve the rear view of the driver. The arm member 18 has a plate 21 formed at the end thereof with a suitable adhesive on the surface 22 of the plate to secure the apparatus to a windshield 23 as shown in FIG. 2. Beyond the foregoing, it is apparent by reference to FIGS. 1 and 2 that the pivotal connecting means 16 referred to above provides a capability for relative pivotal movement thereabout of the Fresnel lens 10, the mirror 11 and the arm members 17 and 18.

Figure 3:
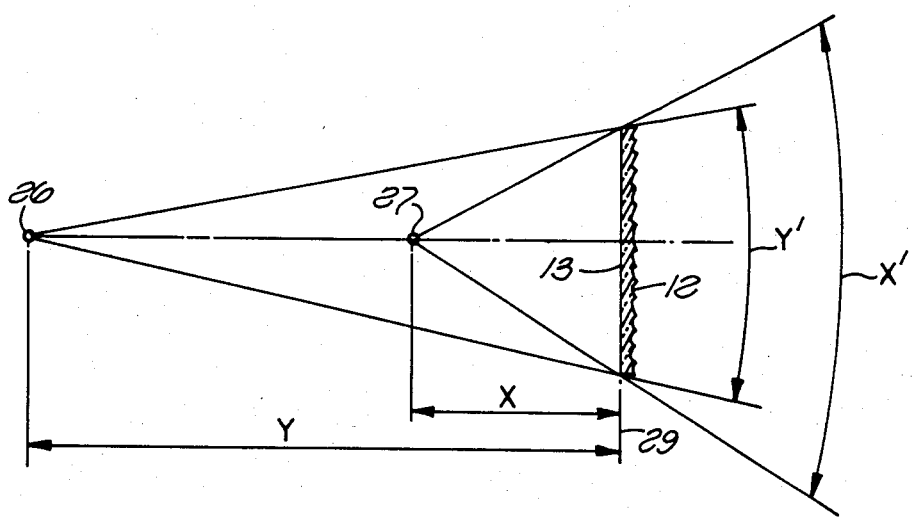
FIG. 3 is a cross-sectional view of the Fresnel lens showing the expanded field of view.

The Fresnel lens 10 has a negative focal length and, as shown in FIG. 3, produces an expanded viewing area. Ordinarily, the view of a person having his eyes at point 26 would have a field of view defined by an arc Y' corresponding to a distance between the actual eye of the viewer and the plane 29. The magnification provided by the Fresnel lens provides a virtual eye to the viewer at point 27 to provide an expanded field of view represented by the arc X'. Thus the effect of the Fresnel lens is to provide a view which the user would observe if his eye were closer to the plane 29 by a distance of Y-X.

Figure 4:
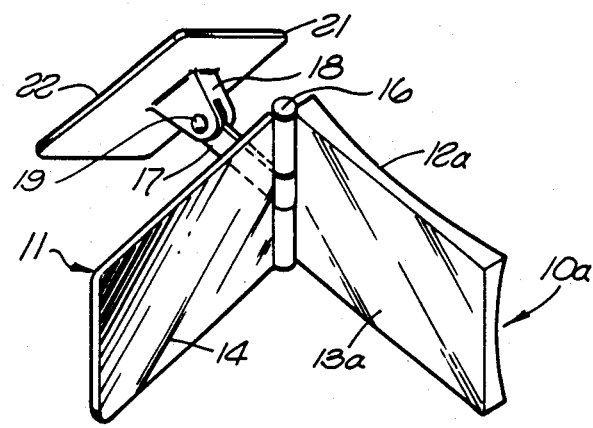
FIG. 4 is a perspective view of an alternative embodiment of the present invention employing a standard lens.
Figure 5:
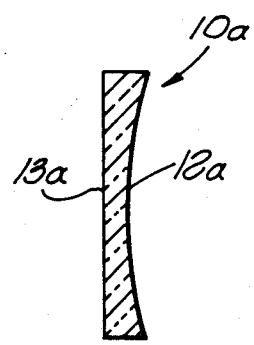
FIG. 5 is a cross-sectional view of the standard lens.
Figure 6:
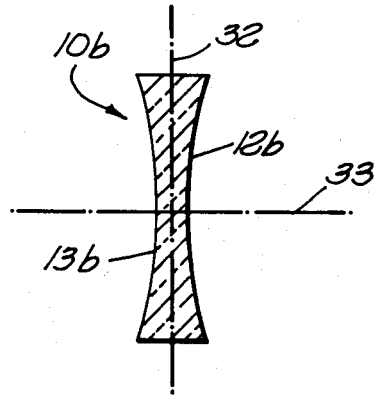
FIG. 6 is a cross-sectional view of an alternative standard lens.

FIG. 4 shows a simple spheric or aspheric negative lens 10a in an embodiment otherwise identical to the embodiment of FIG. 1. The lens 10a has a first surface 12a and a second surface 13a. The first surface is concave and the second surface is flat, as shown in FIGS. 4 and 5. Another suitable standard negative lens 10b is shown in FIG. 6. That lens has a first concave surface 12b and a second concave surface 13b. The first surfaces 12a and 12b and the second surface 13b of these lenses could, by way of example, be spherical surfaces, or aspherical to reduce optical distortion.

In an embodiment of the invention such as the one shown in FIG. 4, but with the double concave lens 10b substituted for the plano-concave lens 10a, an effective angle between the second concave surface 13b and the reflecting surface 14 could be defined in terms of a hypothetical flat surface such as the hypothetical surface 32. The hypothetical surface 32 is perpendicular to the axis 33 of the lens and cuts through the central area of the lens. Other techniques for defining such an effective angle will be readily apparent.

As is well known to those skilled in the art, the optics of the Fresnel lens 10 illustrated and described by way of FIG. 3 also applies to standard negative lenses such as the plano-concave lens 10a and the double concave lens 10b.

The present invention expands the rear view of a motorist to eliminate a blind spot, shown as arc 35 in FIG. 7. This is achieved by mounting an embodiment of the invention in the lower right hand corner of the windshield 23 of the vehicle 36 to provide the added field of view shown as arc 37. The driver would ordinarily observe the rear view arc 42 from the point 40 as reflected by the rear view mirror 41. The added field of view provided by a lens such as the lens 10, 10a, or 10b, reflected by mirror 11, slightly overlaps the view reflected by the rear view mirror 41 to provide an expanded rear view defined by the composite arcs 37 and 42.

Thus, in addition to eliminating the blind spot in the view reflected by standard rear view mirrors, the present invention substantially expands the view on the right hand side of the vehicle to enable a driver to more clearly observe vehicles on the right side of his vehicle. This feature of the present invention provides a substantial advantage over the prior art devices which use lenses mounted on the roof of the vehicle or the rear window of the vehicle. Such devices do not provide as wide an expansion of the rear view on the right of the vehicle as the present invention. This advantage of the present invention is caused by the mounting of the mirror-lens in the lower right hand corner of the windshield.

Many modifications and variations of the present invention are possible in light of the above teachings. It is therefore, to be understood that the invention can be practiced otherwise than as specifically described.

We claim:
1. A view expanding apparatus comprising:
   a lens having a negative focal length for providing an expanded field of view,
   a mirror secured to one edge of said lens and angularly displaced therefrom, said mirror having a reflecting surface for reflecting the expanded field of view,
   arm members including means for mounting said apparatus on a surface, and
   a pin, said lens, said mirror and said arm members being secured to said pin for pivoting relative to each other about said pin, said securing providing adjustability of said angular displacement.
2. The apparatus as described in claim 1 and wherein said lens has a first surface and a second surface and said second surface faces said reflecting surface of said mirror.
3. The apparatus as described in claim 2 and wherein said first surface is concave and said second surface is flat.
4. The apparatus as described in claim 2 and wherein said first and second surfaces are concave.
5. A system for expanding the side and rear view of a vehicle driver comprising:
   a lens having a negative focal length for providing an expanded side and rear view,
   a mirror having a reflecting surface for reflecting the expanded view in the direction of the driver to enable the driver to observe the expanded view,
   securing means for securing one edge of said lens to one edge of said mirror at an angular displacement therefrom,
   arm members connected to said securing means for mounting said system to the interior of the windshield of the vehicle,
   said securing means including pin means, said lens, said mirror and said arm members being secured to said pin means for pivoting relative to each other about said pin means, said securing providing adjustability of said angular displacement.
6. A method of expanding the side and rear view of a driver of a vehicle comprising the steps of:
   mounting a lens having a negative focal length inside the vehicle near the lower right hand corner of the windshield for providing an expanded view to the rear along the side of the vehicle away from the driver, and reflecting the expanded view transmitted by said lens to the driver using a single mirror, inside the vehicle.

7. The method as described in claim 6 and wherein said mounting of said lens is on the windshield of the vehicle.

8. The method as described in claim 7 and wherein said lens has a first surface and a second surface and one edge of said lens is pivotally secured to an edge of said mirror whereby said second surface of said lens and the reflecting surface of the mirror face each other at an adjustable angle.

9. The method as described in claim 8 and wherein said first surface is concave and said second surface is flat.

10. The method as described in claim 8 and wherein said first and second surfaces are concave.

11. The method as described in claim 6 and wherein one edge of said lens is pivotally secured to an edge of said mirror whereby said lens and said mirror have an adjustable angle therebetween.

12. A view expanding apparatus comprising:
a Fresnel lens having a negative focal length for providing an expanded field of view,
a mirror secured to one edge of said Fresnel lens and angularly displaced therefrom, said mirror having a reflecting surface for reflecting the expanded field of view,
arm members including means for mounting said apparatus on a surface, and
a pin, said lens, said mirror and said arm members being secured to said pin for pivoting relative to each other about said pin, said securing providing adjustability of said angular displacement.

13. The apparatus as described in claim 12 and wherein said Fresnel lens has a grooved surface and a flat surface and one of said surfaces faces toward said reflecting surface of said mirror.

14. The method as described in claim 1 and wherein one edge of said Fresnel lens is pivotally secured to an edge of said mirror whereby said Fresnel lens and said mirror have an adjustable angle therebetween.

15. A system for expanding the side and rear view of a vehicle driver comprising:
a Fresnel lens having a negative focal length for providing an expanded side and rear view, and
a mirror having a reflecting surface for reflecting the expanded view in the direction of the driver to enable the driver to observe the expanded view,
securing means for securing one edge of said Fresnel lens to one edge of said mirror at an angular displacement therefrom,
arm members connected to said securing means for mounting said system to the interior of the windshield of the vehicle,
said securing means including pin means, said lens, said mirror and said arm members being secured to said pin means for pivoting relative to each other about said pin means, said securing providing adjustability of said angular displacement.

16. A method of expanding the side and rear view of a driver of a vehicle comprising the steps of:
mounting a Fresnel lens having a negative focal length inside the vehicle near the lower right hand corner of the windshield for providing an expanded view to the rear along the side of the vehicle away from the driver, and
reflecting the expanded view transmitted by said Fresnel lens to the driver using a single mirror, inside the vehicle.

17. The method as described in claim 16 and wherein said mounting of said Fresnel lens is on the windshield of the vehicle.

18. The method as described in claim 17 and wherein said Fresnel lens has a grooved surface and a flat surface and one edge of said Fresnel lens is pivotally secured to an edge of said mirror whereby said flat surface of said Fresnel lens and the reflecting surface of the mirror face each other at an adjustable angle.

* * * * *